US011072156B2

(12) United States Patent
Schulte

(10) Patent No.: US 11,072,156 B2
(45) Date of Patent: *Jul. 27, 2021

(54) METHOD FOR PRODUCING A FLOORBOARD

(71) Applicant: VÄLINGE INNOVATION AB, Viken (SE)

(72) Inventor: Guido Schulte, Rüthen-Meiste (DE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/039,748

(22) PCT Filed: Nov. 11, 2014

(86) PCT No.: PCT/DE2014/100397
§ 371 (c)(1),
(2) Date: May 26, 2016

(87) PCT Pub. No.: WO2015/078443
PCT Pub. Date: Jun. 4, 2015

(65) Prior Publication Data
US 2016/0375674 A1    Dec. 29, 2016

(30) Foreign Application Priority Data

Nov. 27, 2013    (DE) ...................... 10 2013 113 130.1

(51) Int. Cl.
*B32B 38/10*        (2006.01)
*E04F 15/10*        (2006.01)
(Continued)

(52) U.S. Cl.
CPC .............. *B32B 38/10* (2013.01); *B32B 37/10* (2013.01); *B32B 37/12* (2013.01);
(Continued)

(58) Field of Classification Search
CPC ........... B29C 70/465; B32B 7/12; B32B 3/28; B32B 21/14; B32B 9/042; B32B 2317/16;
(Continued)

(56) References Cited

U.S. PATENT DOCUMENTS 2,018,712 A    10/1935   Elmendorf
2,419,614 A     4/1947   Welch
(Continued)

FOREIGN PATENT DOCUMENTS

AU          80284/75        6/1975
AU       2011236087 A1      5/2013
(Continued)

OTHER PUBLICATIONS

JP 53-148506 Computer translation from Japanese, retrieved from https://www.j-platpat.inpit.go.jp/p0200 on Dec. 20, 2019 (Year: 1978).*

(Continued)

*Primary Examiner* — Carson Gross
(74) *Attorney, Agent, or Firm* — Buchanan Ingersoll & Rooney P.C.

(57) ABSTRACT

A method for producing a floorboard having a topside veneer includes forming a multilayer body which includes a starting carrier plate, a plurality of veneers placed on the starting carrier plate so that a gap is formed between neighboring ones of the veneers, a resin layer comprising a resin provided between the starting carrier plate and the veneers, and a balancing layer arranged on a bottom side of the starting carrier plate; joining the starting carrier plate, the resin layer, the veneers and the balancing layer by pressing the multilayer body in a press; separating the multilayer body into individual boards between the neighboring (Continued)

veneers in a region of the gap; profiling the individual boards at side borders of the boards; and providing the individual boards with joining means.

27 Claims, 3 Drawing Sheets

(51) Int. Cl.
*B32B 37/12* (2006.01)
*B32B 37/10* (2006.01)
*E04F 15/02* (2006.01)
*E04F 15/04* (2006.01)
*B32B 38/00* (2006.01)

(52) U.S. Cl.
CPC ...... *E04F 15/02038* (2013.01); *E04F 15/045* (2013.01); *E04F 15/107* (2013.01); *B32B 37/1292* (2013.01); *B32B 38/0004* (2013.01); *B32B 2037/1253* (2013.01); *B32B 2317/16* (2013.01); *B32B 2419/04* (2013.01); *B32B 2471/00* (2013.01); *E04F 2201/0115* (2013.01); *E04F 2201/023* (2013.01)

(58) Field of Classification Search
CPC . E04F 15/02038; E04F 15/045; E04F 15/107; E04F 2201/023
USPC ........................................................ 156/265
See application file for complete search history.

(56) References Cited

U.S. PATENT DOCUMENTS

| | | | |
|---|---|---|---|
| 2,587,064 A | 2/1952 | Rapson |
| 2,630,395 A | 3/1953 | McCullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 * | 8/2009 | Pervan ............... E04F 15/04 52/792.11 |
| 7,678,425 B2 | 3/2010 | Oldorff |
| 7,811,489 B2 | 10/2010 | Pervan |
| 7,918,062 B2 * | 4/2011 | Chen ............... B41J 3/407 52/311.1 |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |

(56) References Cited

U.S. PATENT DOCUMENTS

| | | |
|---|---|---|
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schultz |
| 10,442,164 B2 * | 10/2019 | Schulte ................. B32B 37/10 |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 * | 12/2004 | Thiers .................... B32B 3/30 52/578 |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Meersseman et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 * | 6/2010 | Kreuder ................. E04F 15/02 428/201 |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 * | 3/2012 | Brewster ................. B32B 3/12 160/368.1 |
| 2012/0124932 A1 | 5/2012 | Schulte et al. |
| 2012/0263878 A1 | 10/2012 | Ziegler et al. |

(56) References Cited

U.S. PATENT DOCUMENTS

| | | |
|---|---|---|
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0101310 A1 | 4/2021 | Lindgren et al. |

FOREIGN PATENT DOCUMENTS

| | | |
|---|---|---|
| CA | 2 557 096 A1 | 7/2005 |
| CA | 2 852 656 A1 | 4/2013 |
| CH | 298894 A | 5/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 102 45 914 A1 | 9/1998 |
| DE | 202 14 532 U1 | 2/2004 |
| DE | 103 00 247 A1 | 7/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 234 220 A2 | 9/1987 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 1 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 0 993 934 A2 | 4/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 A1 | 9/2002 |
| EP | 1 249 322 A1 | 10/2002 |
| EP | 1 262 607 A1 | 12/2002 |
| EP | 1 388 414 A1 | 2/2004 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 584 378 A1 | 10/2005 |
| EP | 1 657 055 A1 | 5/2006 |
| EP | 1 681 103 A2 | 7/2006 |
| EP | 1 690 603 A1 | 8/2006 |
| EP | 1 507 664 B1 | 7/2007 |
| EP | 1 808 311 A1 | 7/2007 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2 213 476 A1 | 8/2010 |
| EP | 2 226 201 A1 | 9/2010 |
| EP | 2 246 500 A2 | 11/2010 |
| EP | 2 263 867 A1 | 12/2010 |
| EP | 2 264 259 A2 | 12/2010 |

(56) References Cited

FOREIGN PATENT DOCUMENTS

| | | |
|---|---|---|
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2 415 947 A2 | 2/2012 |
| EP | 2 263 867 B1 | 3/2012 |
| EP | 2 902 196 A1 | 8/2015 |
| EP | 2 902 196 B1 | 8/2016 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | S51-128409 A | 11/1976 |
| JP | S52-087212 A | 7/1977 |
| JP | S53-148506 | 12/1978 |
| JP | S56-049259 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | H02-229002 A | 9/1990 |
| JP | H03-030905 A | 2/1991 |
| JP | 03211047 A * | 9/1991 |
| JP | H03-211047 A | 9/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | 11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054600 A1 | 6/2005 |
| WO | WO 2005054599 A1 * | 6/2005 ............... B44F 3/00 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/015682 A1 | 2/2009 |
| WO | WO 2009/050565 A1 | 4/2009 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/084466 A2 | 7/2010 |
| WO | WO 2010/087752 A1 | 8/2010 |
| WO | WO 2010/094500 A1 | 8/2010 |
| WO | WO 2011/058233 A1 | 5/2011 |
| WO | WO 2011/087422 A1 | 7/2011 |
| WO | WO 2011/087423 A1 | 7/2011 |
| WO | WO 2011/087424 A1 | 7/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2012/076608 A1 | 6/2012 |
| WO | WO 2012/141647 A1 | 10/2012 |
| WO | WO 2012/154113 A1 | 11/2012 |
| WO | WO 2013/056745 A1 | 4/2013 |
| WO | WO 2013/079950 A1 | 6/2013 |
| WO | WO 2013/139460 A1 | 9/2013 |
| WO | WO 2013/167576 A2 | 11/2013 |
| WO | WO 2013/182191 A2 | 12/2013 |
| WO | WO 2013/182191 A3 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/078443 A1 | 6/2015 |
| WO | WO 2015/078444 A1 | 6/2015 |
| WO | WO 2015/105455 A1 | 7/2015 |
| WO | WO 2015/105456 A1 | 7/2015 |

(56) References Cited

FOREIGN PATENT DOCUMENTS

| WO | WO 2015/106771 A1 | 7/2015 |
|---|---|---|
| WO | WO 2015/174909 A1 | 11/2015 |
| WO | WO 2016/151435 A1 | 9/2016 |

OTHER PUBLICATIONS

U.S. Appl. No. 16/223,708, Göran Ziegler, Dec. 18, 2018.
U.S. Appl. No. 16/223,833, Göran Ziegler, Dec. 18, 2018.
Ziegler, Göran, U.S. Appl. No. 16/223,708 entitled "A Method to Produce a Veneered Element and a Veneered Element," filed in the U.S. Patent and Trademark Office on Dec. 18, 2018.
Ziegler, Göran, U.S. Appl. No. 16/223,833 entitled "A Method to Produce a Veneered Element and a Veneered Element," filed in the U.S. Patent and Trademark Office on Dec. 18, 2018.
U.S. Appl. No. 16/738,334, Anette Hedlund and Sofia Nilsson, Jan. 9, 2020.
Extended European Search Report issued in EP 19177864.6, dated Nov. 6, 2019, 9 pages, European Patent Office, Munich, DE.
Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).
Hedlund, Anette, et al., U.S. Appl. No. 16/738,334 entitled "Method to Produce a Veneer Element and a Veneer Element," filed in the U.S. Patent and Trademark Office on Jan. 9, 2020.
U.S. Appl. No. 14/593,458, Göran Ziegler, Jan. 9, 2015, (Cited herein as US Patent Application Publication No. 2015/0197943 A1 of Jul. 16, 2015).
U.S. Appl. No. 15/183,424, Darko Pervan, Jun. 15, 2016, (Cited herein as US Patent Application Publication No. 2016/0369507 A1 of Dec. 22, 2016).
U.S. Appl. No. 15/308,737, Christer Lundblad, Nov. 3, 2016, (Cited herein as US Patent Application Publication No. 2017/0190156 A1 of Jul. 6, 2017).
U.S. Appl. No. 15/496,357, Marcus Bergelin, Apr. 25, 2017, (Cited herein as US Patent Application Publication No. 2017/0305119 A1 of Oct. 26, 2017).
U.S. Appl. No. 15/039,638, Guido Schulte, May 26, 2016, (Cited herein as US Patent Application Publication No. 2017/0120564 A1 of May 4, 2017).
U.S. Appl. No. 15/039,504, Guido Schulte, May 26, 2016, (Cited herein as US Patent Application Publication No. 2017/0165936 A1 of Jun. 15, 2017).
U.S. Appl. No. 16/132,977, Darko Pervan, Sep. 17, 2018.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE, XP055332791.
Odian, George, "Principles of Polymerization," 1991, 3rd Edition, 5 pages incl. pp. 122-123, John Wiley & Sons, Inc., New York, NY, USA.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).
Pervan, Darko, et al., U.S. Appl. No. 16/132,977 entitled "Wood Fibre Based Panel with a Surface Layer," filed in the U.S. Patent and Trademark Office on Sep. 17, 2018.
U.S. Appl. No. 16/325,543, Göran Ziegler, Feb. 14, 2019.
Mercene Labs, official home page, retrieved Feb. 23, 2017, retrieved from the Internet: http://www.mercenelabs.com/technology/, according to the Internet Archive WayBack Machine this page was available on Jan. 22, 2013.
Ziegler, Göran, U.S. Appl. No. 16/325,543 entitled "A Method to Coat a Building Panel and Such a Coated Building Panel," filed in the U.S. Patent and Trademark Office on Feb. 14, 2019.
Mercene Labs, "Industrial coatings," retrieved Mar. 28, 2020, 2 pages, retrieved from the Internet https://web.archive.org/web/20140825055945/http://www.mercenelabs.com/products/coating-of-difficult-substrates/ according to the Internet Archive WayBack Machine this page was available on Aug. 25, 2014 (XP055674250).
U.S. Appl. No. 16/556,289, Guido Schulte, Aug. 30, 2019.
U.S. Appl. No. 16/571,547, Guido Schulte, Sep. 16, 2019.
Schulte, Guido, U.S. Appl. No. 16/556,289 entitled "Floorboard," filed in the U.S. Patent and Trademark Office on Aug. 30, 2019.
Schulte, Guido, U.S. Appl. No. 16/571,547 entitled "Floor, Wall, or Ceiling Panel and Method for Producing Same," filed in the U.S. Patent and Trademark Office on Sep. 16, 2019.
U.S. Appl. No. 16/365,764, Christer Lundblad, Mar. 27, 2019.
Lundblad, Christer, et al., U.S. Appl. No. 16/365,764 entitled "A Method of Producing a Veneered Element and Such a Veneered Element," filed in the U.S. Patent and Trademark Office on Mar. 27, 2019.
International Search Report issued by the European Patent Office in International Application PCT/DE2014/100397.
U.S. Appl. No. 17/038,567, Marcus Bergelin, Sep. 30, 2020.
U.S. Appl. No. 17/090,511, Guido Schulte, Nov. 5, 2020.
Bergelin, Marcus, et al., U.S. Appl. No. 17/038,567 entitled "Veneered Element and Method of Producing Such a Veneered Element," filed in the U.S. Patent and Trademark Office Sep. 30, 2020.
Schulte, Guido, U.S. Appl. No. 17/090,511 entitled "Floor, Wall, or Ceiling Panel and Method for Producing Same," filed in the U.S. Patent and Trademark Office Nov. 5, 2020.
Ziegler, Göran, et al., U.S. Appl. No. 17/202,836 entitled "Method to Produce a Veneered Element and a Veneered Element," filed in the U.S. Patent and Trademark Office Mar. 16, 2021.
Ziegler, Göran, et al., U.S. Appl. No. 17/205,469 entitled "Method of Producing a Veneered Element," filed in the U.S. Patent and Trademark Office Mar. 18, 2021.
Slottemo, Andreas, et al., U.S. Appl. No. 17/232,687 entitled "Method for Producing a Building Element, a Pressing Device and a Method of Embossing a Wooden Surface," filed in the U.S. Patent and Trademark Office on Apr. 16, 2021.

* cited by examiner

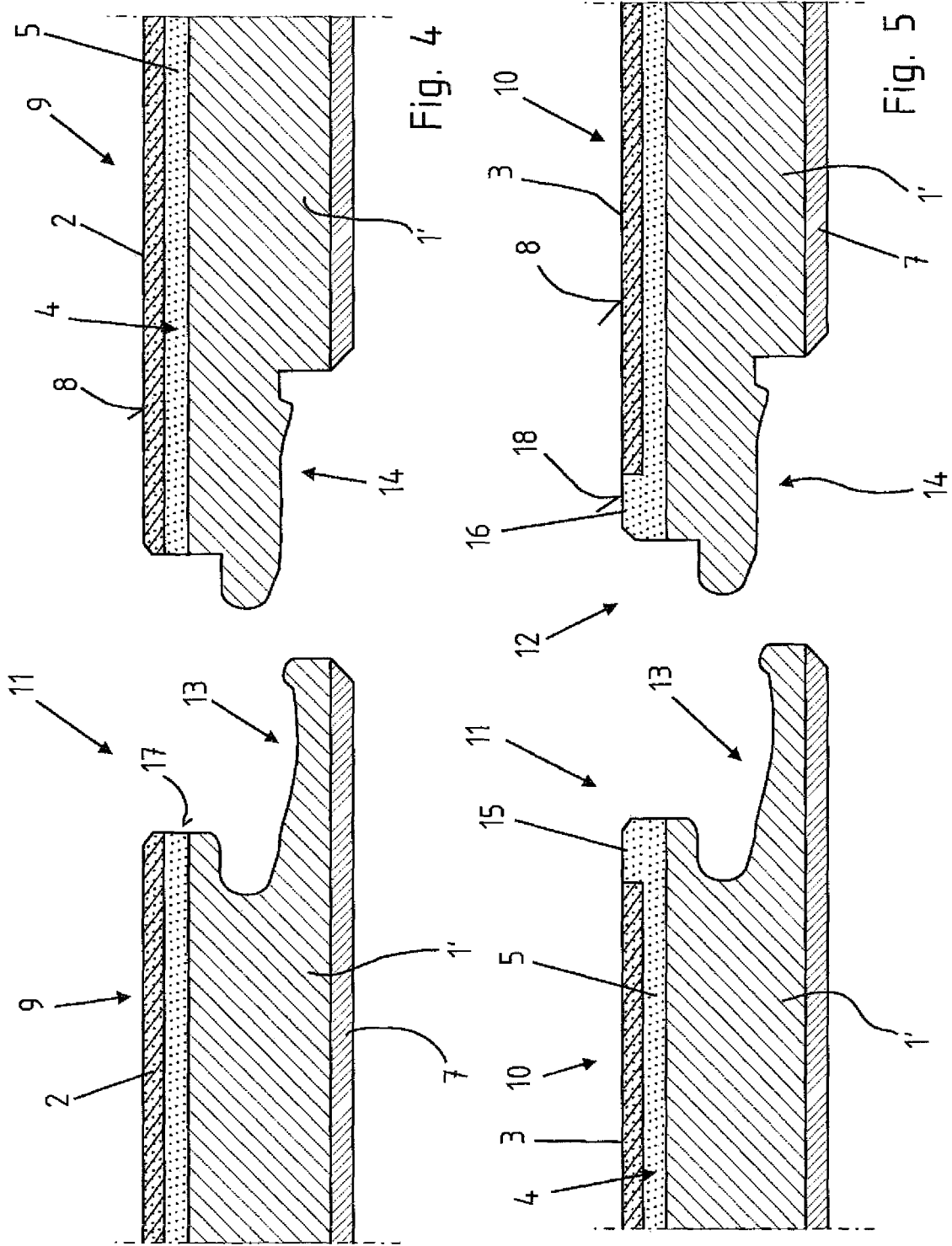

METHOD FOR PRODUCING A FLOORBOARD

CROSS-REFERENCES TO RELATED APPLICATIONS

This application is the U.S. National Stage of International Application No. PCT/DE2014/100397, filed Nov. 11, 2014, which designated the United States and has been published as International Publication No. WO 20151078443 and which claims the priority of German Patent Application, Serial No. 10 2013 113 130.1, filed Nov. 27, 2013, pursuant to 35 U.S.C. 119(a)-(d).

BACKGROUND OF THE INVENTION

The invention relates to a method for producing a floorboard which has a carrier plate and a topside veneer.

Floorboards with a top or cover layer of real wood are in particular used as real wood floors or parquet floors. Such floors provide a natural living atmosphere. They are pleasantly warm when walking on it and compensate humidity fluctuations in the room air, which contributes to a healthy room atmosphere. Also floor boards with a top or cover layer made of cork or a cork veneer are very popular.

A method for producing parquet or veneer floorboards with a cover layer of real wood is described in DE 102 45 914 A1. There a cover layer of real wood is impregnated with thermoset synthetic resins. After the impregnation the cover layer is glued to the carrier plate. The cover layer is also printed on.

SUMMARY OF THE INVENTION

Common are floor panels with a three layer construction and profiled joining surfaces at the side borders for forming joining means in the form of groove and tongue or a so-called click system. The joining means enable a mechanical coupling of the individual panels with each other in a floor cover or a wall or ceiling covering. The carrier plate is usually made of a wood material, in particular a highlight compressed fiber plate (HDF). The topside cover layer of real wood can be of different thickness. When the cover layer of wood has a thickness of more than 2.5 mm there is a parquet floor. According to a common terminology used in the art veneers for cover layers of floor panels start at about 0.4 mm. generally floor panels with wood cover layers of smaller than 2.5 mm are referred to as real wood or veneer floors.

After the gluing on the veneer, flaws in the surface, for example branch holes or cracks, are smoothened over. Usually an excess of smoothening compound is used which excess is then removed again later. This is usually performed by grinding or brushing. In particular in the of thin veneer layers this involves the risk that the layer is damaged by the subsequent mechanical processing. For this reason oftentimes veneers are used that are thicker to begin with or veneers that have flaws are sorted out beforehand. However this is uneconomical and also leads to the fact that the variability of the optical appearance of the natural wood floors is diminished.

Also known is a so-called real wood laminate. In this case a overlay is applied to the cover layer made of veneer for example in the form of a melamine paper or melamine film. Subsequently this sandwich is then pressed. A disadvantage is that the flaws naturally occurring in this product such as gaps cracks branches or pores often times appear milky. The cause for this is the missing or insufficient pressing pressure during the pressing process because in the region of the flaws the counter pressure is absent. On the other hand when a higher pressure is applied the structure of the press plate dominates the wood surface and the natural wood structure or appearance suffers.

Based on the state of the art the invention is based on the object to provide an efficient method for producing floorboards with a topside veneer, which saves material and costs.

The object is solved with a method according to the independent claim.

Advantageous embodiments and aspects of the inventions are the subject matter of the dependent claims.

The present invention relates to a method for producing a floorboard, which has a carrier plate and a topside veneer. The invention in particular relates to the production of real wood or veneer floor boards with a veneer of wood and a thickness of the veneer of smaller than 2.5 mm in particular with a thickness between 0.6 mm and 1.2 mm. the veneer can also be a cork veneer in particular a cork oak veneer.

The method according to the invention is characterized by the following steps:
providing a large area starting carrier plate;
providing a number of veneers;
forming a multi-layer body form the starting carrier plate and the veneers and a resin layer provided between the starting carrier plate and the veneers, wherein neighboring veneers are positioned spaced apart relative to each other on the starting carrier plate so that a gap is formed, and a balancing layer arranged on a bottom side of the starting carrier plate;
connecting the starting carrier plate, resin layer and veneers and the balancing layer by pressing the multi-layer body in a press;
subsequently separating the pressed multilayer body into individual boards, wherein the separation is preformed in the region of a gap between two neighboring veneers and
the boards are profiled at their side borders and are provided with connecting means.

The pressing process in which the layers of the multilayer body are pressed with each other and connected, is performed with the following process parameters:
the pressing pressure is greater or equal to ($\geq$) 1,000 kilopascal (kPa), preferably greater than or equal to ($\geq$) 3,500 kilo Pascal (kPA)
the pressing temperature is grater or equal to ($\geq$) 100° C., in particular greater or equal to ($\geq$) 120° C. and is preferably in the temperature range between 180° C. and 120° C.
the pressing time is between 10 and 60 seconds.

During the pressing of the multilayer body the resin of the resin layer is plasticized under the influence of heat and cured. By means of the resin the starting carrier plate and the wood veneers are glued to each other. Further the gaps between the veneers are filled with resin.

For producing a floorboard according to the invention a large surface starting carrier plate is provided. A large area carrier plate means that it has a size in length and width which corresponds to a multiple, in particular a integer multiples of the size of one floor board.

The starting carrier plate and thus the carrier plate of a floor board is a plate material made of a wood material, such as solid wood, chipboard, wood fiver material, MDF (Medium Density Fiber Board) or HDF (High Density Fiber Board). Within the scope of the invention preferably a carrier plate made of HDF is used. Also conceivable are carrier plates made of waterproof materials for example in the basis of mineral materials such as fiber cement, sand-bindegemische or wood plastic composite materials (wood-plastic-composites WPC) and wood fiber polymer composite materials or also the use of magnesite plates. An aspect is here directed towards the use of natural fiber reinforced plastic as work material for the carrier plate or the basis carrier plate. Beside wood fibers also other plant fibers such as Jute or Flax can be used in particular in a wood fiber or wood powder proportion of 50% to 90% and a plastic matrix of polypropylene (PP). further a wood plastic composite on the basis of thermoplastically processible thermoset which contain modified melamine resin with natural fiber or natural powder proportion find use. In this connection also bamboo plastic composites (BPC) offers interesting practical approaches. In this material bamboo fibers or bamboo powder are used as natural material.

As mentioned above, also plates on the basis of cement containing binders or fiber cement plates can be used as carrier plate. Also like magnesite plates. Magnesite plates are made of a mixture of magnesium oxide, calcium carbonate, silicates and fibers, in particular wood and/or glass fibers. An advantage of magnesite plates is the low weight and the low heat conducting capacity as wells as their flame resistance. Magnesite plates are categorized as non-flammable.

The starting point of the production of the floorboards according to the invention is a large-area carrier plate, in the present case referred to as starting carrier plate. Such a large-area starting carrier plate is rectangular and has a size of 2,000 mm to 5,000 mm in length and 1,200 mm to 2,100 mm in width. Usually the carrier plate or the starting carrier plate has a thickness of 4.5 mm to 12 mm.

An important aspect of the invention is that a resin layer is provided between the carrier plate and the veneer and the carrier plate, the resin layer and the veneer are pressed together and are joined to each other. The veneers are hereby positioned on the carrier plate with a lateral distance to each other so that a gap is formed between the veneers. The veneer is permeated or infiltrated by the resin of the resin layer. The pressing is conducted hot at a temperature of more than 100° C., more than 120° C., preferably at a temperature between 180° C. and 210° C. The pressing temperature relates to the temperature at the press plate of the press. This temperature is also present at the contact surfaces between the press plate and the topside of the veneer or the bottom side of the carrier plate.

The resin layer is made of a resin. This is in particular a thermoset synthetic resin. Colored or transparent melamine resins or melamine/polyurethane mixtures can be used. An aspect of the invention is directed towards using resins, which cure or react under the influence of heat and pressure. In this connection aminoplastic, thermoset or reactive resins such as polyurethane (PUR) or thermoplastic Polyurethane can be used. The resin can be present on a paper-type carrier in the form of a paper impregnate, also referred to as resin layer. The resin or the resin layer can further be present or configured as resin film.

The veneers are provided as strips or plates. The veneers are positioned on the starting carrier plate with a lateral distance to each other so that a gap is formed. Hereby the veneers are arranged or positioned so that continuous gaps are created that extend along a longitudinal direction of the starting carrier plate and are spaced apart by a width corresponding to a floorboard to be separated. A multilayer body is formed including the starting carrier plate and the veneers. Between the starting carrier plate and the veneers a resin layer is incorporated. On the bottom side of the starting carrier plate a balancing layer is arranged. The thusly formed multilayer body is then pressed in a press so that the starting carrier plate, the resin layer and the veneers and the balancing layer are joined. The pressing of the multilayer body is preformed in a press, i.e. at a pressing pressure of greater or equal to 1,000 Kilopascal (kPa). Preferably the pressing pressure is above 3,500 Kilopascal (kPa). The pressing temperature is greater or equal to ($\geq$) 100° C., in particular greater than or equal to ($\geq$) 120° C. Preferably the pressing temperature is between 180° C. and 120° C. The pressing temperature is in relation to the temperature at the pressing plate or the press. Within the framework of the method according to the invention the pressing time in chi the multilayer body is impinged with pressure in the pressing tool is between 10 seconds and 60 seconds.

During the pressing process the surface of the veneers may be provided with a texture, a pattern or ornaments by a textured plate or a texturizer. Subregions of the texture may vary regarding glossiness. The texture may also have different depth. The depth of the texture can be up to 0.6 mm. Relative to the veneer thickness the texture can have a depth of ⅔ of the thickness of the veneer.

After the pressing process the pressed multilayer body is separated into individual boards. The separation of the multilayer body into individual boards is carried out in the region of a gap between two neighboring veneers. The separation occurs thus between two boards in the gap which is filled with the cured resin, and which extends over the length of the starting carrier plate. The width of the individual veneers is adjusted to the width of the individual floorboard.

The division of the pressed multilayer body is performed after cooling. For this purpose the multilayer body can be transported over a cooling path or can be intermediately stored for cooling.

In a subsequent work step the individual boards are profiled at their side borders. The profiling is only performed after the carrier plate has cooled to room temperature. The profiling serves in particular for forming joining means at the longitudinal and transverse sides of the panels.

During the profiling the remainder of the gap, which extends as border strip made of resin along a floorboard, can be completely removed. Further it is possible that a border strip made of resin remains along the side borders of the veneer. The side borders made of resin form a visual contrast to the veneer. In addition the border strip is advantageous during the mechanical processing of the side borders. Because the side border regions of the boards are stabilized by the resin, a mechanical processing is advantageously possible. In particular fraying of the veneer can be avoided.

As pressing tool, in particular a shod-contact press, is used or a continuous press. During the hot pressing process or the pressing process under heat influence, the resin layer is plasticized and penetrates into the veneer. An important aspect of the invention is that the resin of the resin layer permeates the veneer up to the topside of the veneer. This causes pores, cracks, gaps and/or other flaws in the veneer to be filled with resin during the pressing process. The resin of the resin layer forms an inseparable connection between the veneer and the carrier plate. A particular advantage of the invention is thus that two production steps, i.e. gluing and smoothening of the veneer are performed in one step.

In particular the pressing of the multilayer body is performed so that the resin permeates the veneer and after the pressing the resin is visible at the surface of the veneer. In this connection in particular resins that are color coordinated with the color of the veneer are used. In terms of production a black resin is regarded as universally advantageous. Suitably the pressing is performed so that no or only very little resin sticks to the surface of the veneer and with this the floorboard. Pores, cracks, gaps or other flows are visibly filled. However, no or only very little excess resin exits on the surface. The pressed product then only has to be texture-brushed and may be provided with a surface oil treatment or varnishing.

Within the framework of the invention, the resin layer can be formed by a resin paper. The resin paper is made of a paper with a paper weight of 30 g/m² up to 120 g/m². This paper is soaked with resin and has then at least twice or three times the weight, preferably the resin paper has a weight of more than 100 g/m². The resin paper is thus a paper impregnate with a strong excess of resin. The resin paper is integrated between the starting carrier layer and the veneers. For this the products are joined layer by layer including the balancing layer. Subsequently the multilayer body is pressed.

An alternative provides that the resin layer is formed by a resin film that is applied on the topside of the starting carrier plate. Hereby the resin is applied to the starting carrier plate in liquid form and is partially dried or pre-condensed. The resin film adheres to the starting carrier plate as a gel or wax-like layer.

The resin layer can also be formed on the bottom side of the veneers in the form of a resin film. Also in this case the resin is applied in liquid form on a side of the veneers. As a result the veneers are impregnated with resin. The resin applied in liquid form is partially dried and pre-condensed. The thus impregnated veneer provided with the resin layer is further processed after producing the resin layer. Prior to forming the multilayer body the veneers are rotated so that the resin layer is on the bottom side of the veneers and comes into contact with the topside of the starting carrier plate.

A resin film can also be formed by applying resin in powder form onto the surface of the starting carrier plate or onto the veneers. The pulverous resin is then melted under heat influence so that the resin film forms.

Generally the resin can also be present or processed paste-like, i.e., in the form of a paste.

The amount of resin is dosed so that it infiltrates or permeates through the veneer, however it cannot exit onto the surface of the veneer as a result of the closed press. The resin is pressed into and fills pores, flaws, cracks or gaps in the veneer. The natural wood surface or cork surface and texture remains preserved. The resin can be thickened with a filler. As a result more mass is present in order to fill pores, cracks, gaps and/or flaws. As filler organic or inorganic materials can be used, in particular mineral pigments, stone powder or chalk, as well as wood powder or wood meal.

The balancing layer compensates tensions in the multilayer body. The balancing layer can be a veneer, a paper, a foil or a film, in particular a synthetic resin film. Advantageously a balancing veneer or a balancing paper is also provided with resin or is impregnated with synthetic resin. The balancing layer is pressed during production of the floorboards according to the invention together with the starting carrier plate, the veneers and the resin layer and connected on the bottom side with the starting carrier plate.

The floorboards are profiled at their side borders and are provided with joining means. Joining means can be configured as groove and tongue. Preferably the side borders are provided with a click joint. The boards can also be provided with a circumferential chamfer at their topside borders. In the case of a floorboard with chamfer the intermediate resin layer has a very positive effect on the humidity sealing in the installed product.

A color design of the floorboard is also possible when the resin is visible at the side borders. In particular this is accomplished by a colored resin, which is color coordinated with the veneer. Hereby individual or all side borders can be configured with a visible border strip of resin. A variance in optical design of a panel results when a resin is used that has a color that contrasts the color of the veneer. This for example allows generating a particular visual appearance of the joints in a targeted manner. The interplay between resin and veneer enables visual accentuation of the surface of a floor-, wall- or ceiling-panel according to the invention. For this purpose also effect material can be used in the resin, as mentioned pigments and other fillers.

A further aspect is to form the chamfer as a decorative visually delimiting edge. Further the veneer can be printed with a decor. Preferably the printing is performed by means of digital printing. Hereby a system of printing inks is used that is adapted to the used resins. It is possible to apply a sealing to the veneer. The term sealing means the application of color, a pickle or an oil or a varnish or varnish system.

It is particularly advantageous that the floorboard or the surface of the veneer can be subjected to a mechanical processing after the pressing. The surface treatment in particular includes grinding or brushing of the surface. This allows accentuating the natural visual appearance of the surface. By unevenly treating the surface an aged structure or look, a so-called vintage optic can be achieved. The surface of the boards can thus for example have a rough-sewn surface or chatter marks or grinding flaws or the like.

A floorboard produced with the method according to the invention is cost-effective in manufacture and has a high quality. Particularly advantageous is that no large-area stitched or glued veneers have to be used that are adjusted to the dimensions of a starting carrier plate. The division of the starting carrier plate into individual floorboards is performed along the gaps formed between the wood veneers.

The boards are compelling in their natural wood optic or cork optic with a rustic character due to the optically perceptible filled cracks, gaps and/or branch holes. Because the veneer, i.e., the topside wear surface or cover layer of the panel is permeated or impregnated with resin, in addition the resistance, in particular impact resistance and wear resistance is increased. The increased resistance enables mechanical processing of the veneer for example by grinding or brushing with a lower risk of destroying the optic by the mechanical processing. The boards are significantly more durable. Advantageously the invention also enables using softer woods or veneers made of softer woods such as larch. As a result of the impregnation or permeation with resin a veneer made of a soft wood becomes harder and more durable.

Within the framework of the invention also advantageously vapored or smoked veneers can be used. Particularly suited are further veneers made of coarse-pored woods such as oak, ash, larch or spruce as well as veneers made of cork. The quality of the veneers is improved and the veneers are optically accentuated by the infiltration with resin according to the invention.

BRIEF DESCRIPTION OF THE DRAWINGS

In the following the invention is explained by way of drawings. It is shown in

FIG. 4 an enlarged view of the region of the longitudinal side of two neighboring floor boards with corresponding locking means and FIG. 5 again an enlarged view of the region of the longitudinal side of two neighboring floorboards in a further embodiment.

DETAILED DESCRIPTION OF THE PREFERRED EMBODIMENTS

Figure 1:
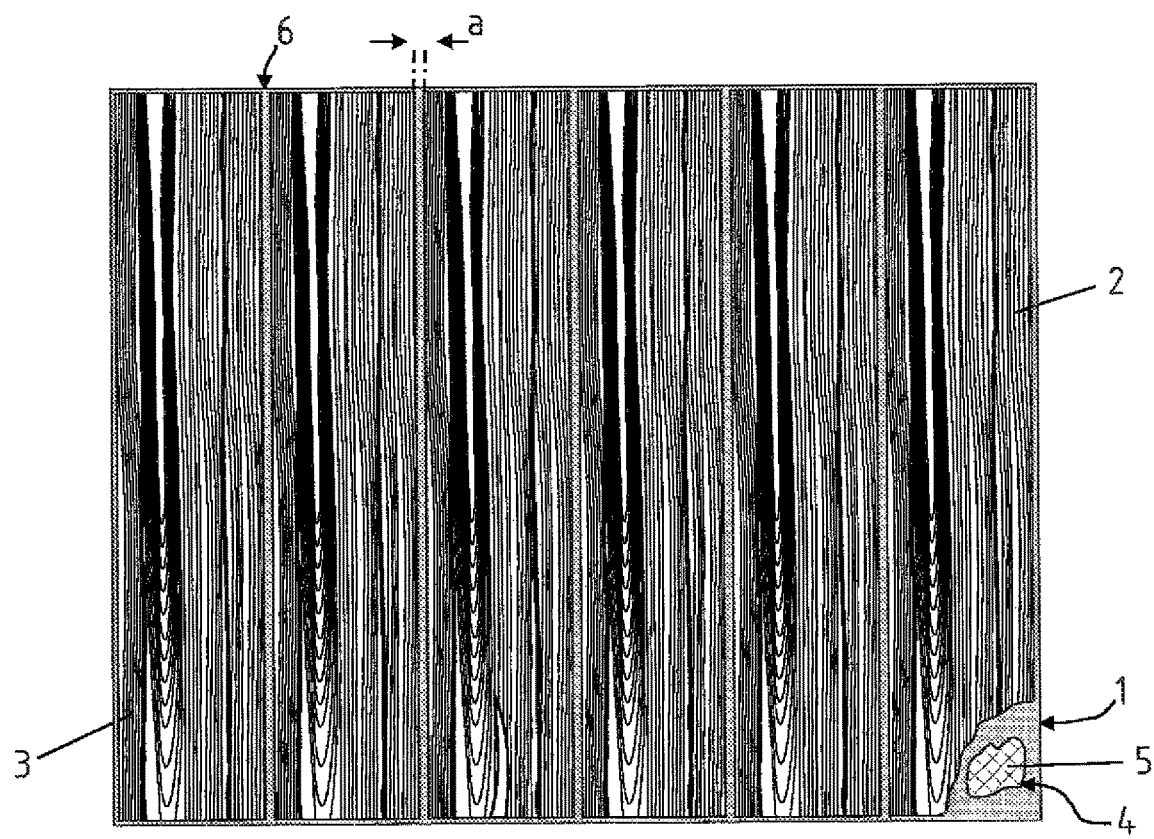
FIG. 1 a top view onto a section of a multilayer body prior to the pressing

For producing floorboards according to the invention a multilayer body is formed. The multilayer body includes a large area starting carrier plate 1. The starting carrier plate 1 is shown in FIG. 1. The starting carrier plate 1 is configured rectangular. Common starting carrier plates 1 have a length between 2,000 mm to 5,600 mm and a width of 1,200 mm to 2,100 mm. usually the starting carrier plate 1 has a thickness of 4.5 mm to 12 mm. on the topside of the starting carrier plate 1 wood veneers 2, 3 are placed. On the bottom side of the starting carrier plate 1 a balancing layer, which is not shown in FIG. 1, is provided between the starting carrier plate 1 and the wood veneers 2, 3 a resin layer 4 made of resin 5 is provided. The resin 5 or the resin layer 4 is indicated schematically in FIG. 1. The resin layer 4 extends two dimensionally over the starting carrier plate 1.

Onto the starting carrier plate 1 the individual wood veneers 2, 3 are place as strips. The strips extend over the entire length of the starting carrier plate 1 between the starting carrier plate 1 and the veneers 2, 3 the resin layer 4 of resin 4 is integrated (interposed). The resin is in particular a thermoset synthetic resin. The resin layer 4 can be formed by a resin paper. As an alternative the resin layer 4 is formed by a resin film applied onto the topside of the starting carrier plate 1. The resin layer 4 can also be formed by a resin film applied to the bottom side of the veneers 2, 3.

The individual veneers 2, 3 are spaced apart by a lateral distance a so that a gap 6 is formed between. the individual veneers 2, 3. As mentioned, on the bottom side of the starting carrier plate 1 the balancing layer is arranged. A balancing layer 7 is shown in FIGS. 4 and 5. The starting carrier plate 1 with the placed veneers 2, 3 and the interposed resin layer 4 and the balancing layer 7 form the multilayer body. The multilayer body is placed in a pressing tool where it is pressed. The pressing pressure is greater or equal to 1,000 KPa preferably greater or equal to 3,500 KPa. The pressing temperature is greater than or equal to 100° C., in particular greater than or equal to 120° C. preferably the pressing temperature is between 180° C. and 210° C. the pressing time can be between 10 and 60 seconds.

Figure 2:
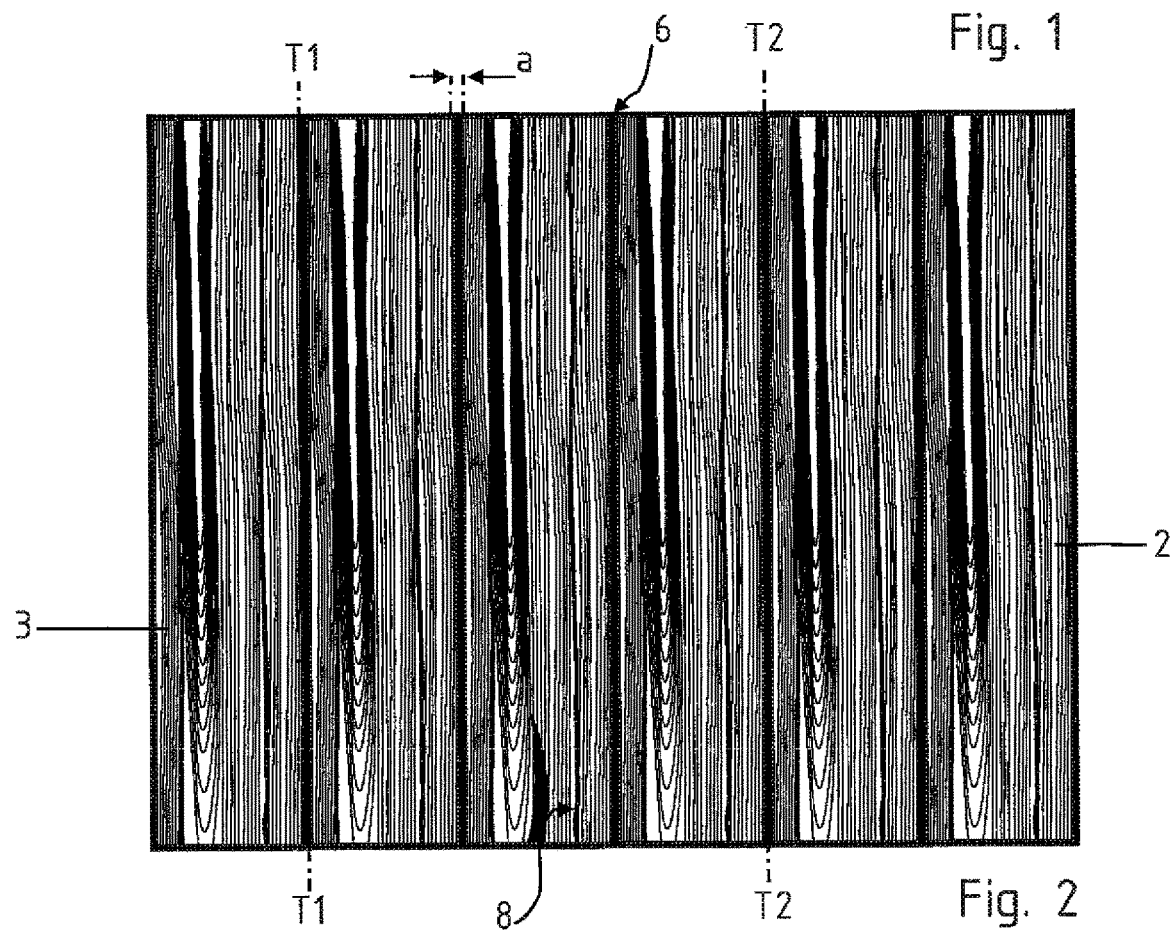
FIG. 2 a representation of the multilayer body after the pressing.

FIG. 1 shows the multilayer body prior to the pressing. FIG. 2 shows the multilayer body after the pressing. During the pressing of the multilayer body the resin 5 of the resin layer 4 is plasticized under the influence of heat and cured. By means of the resin 5 the starting carrier plate 1 and the wood veneers 2, 3 are glued to each other. Further the gaps 6 between the veneers 2, 3 are filled with resin 5. Moreover, the resin infiltrates the wood veneers 2, 3. The resin permeates the veneers 2, 3 up to their topside or surface 8. As a result pores, cracks, gaps and/or other flaws in the veneers 2, 3 are filled with resin 5. The veneers 2, 3 are permeated with resin 5 so that after the pressing resin 5 is visible at the surface 8 of the veneers 2, 3.

Figure 3:
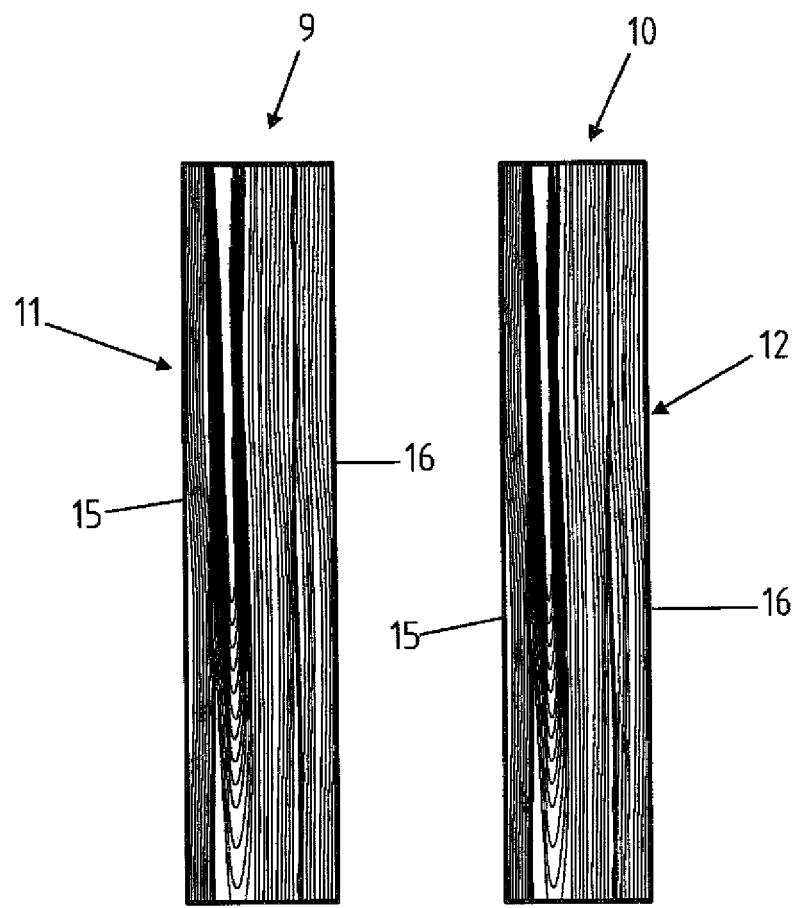
FIG. 3 a top view onto individual floorboards.

After the pressing the pressed multilayer body is separated into individual floorboards 9, 10. Individual floorboards 9, 10 are shown in FIG. 3. The separation of the multilayer body into individual floorboards 9, 10 is performed in the region of a respective gap 6 between two neighboring veneers 2, 3. As an example two separation lines T1, T2 are indicated in FIG. 2 which extend over the length of the starting carrier plate 1 respectively along a gap 6 that is filled with cured resin 5.

In a subsequent work step the side borders 11, 12 of the floorboards 9, 10 are profiled. During the profiling the side borders 11, 12 are provided with joining means 13, 14. Joining means 13, 14 can be recognized in FIGS. 4 and 5. During the profiling the remainder of the border strip 15, which extends along a floorboard 9, 10 as border strip 15, 16 of resin 5, can be completely removed. It is also possible that a border strip 15, 16 of resin 5 remains along the side borders 11, 12 of the veneers 2, 3.

The resin 5 can also be enriched with a filler. The surface of the floorboards 9, 10 can also be printed with a decor. Also the side borders 11, 12 or the border strips 15, 16, which are made of hard resin material, can be printed. The surface of the floorboards 9, 10 can be provided with a sealing. Furthermore the surface of the floorboards 9, 10 can be subjected to a mechanical surface processing, in particular a grinding process and/or a brushing process and/or an embossing process. The aforementioned measures serve for optically accentuating and texturizing the surface.

FIGS. 4 and 5 schematically illustrate the construction of the floorboards 9, 10 produced according to the invention in their vertical plane. The Figures are not to be understood to be to scale.

Each floorboard 9, 10 has a carrier plate 1', on the topside of which a veneer 2 or 3, i.e., a wood veneer is applied. The carrier plate 1' and the wood veneer 2, 3 are pressed and glued to each other via a resin layer 4 or resin. 5 over their entire surface. On the bottom side of the carrier plate 1' the balancing layer 7 is provided. At the side borders 11, 12 of the floorboards 9, 10 connecting means 13, 14 are provided in the form of locking strips. In a floor cover of neighboring floorboards 9, 10 the respective corresponding locking strips engage with each other. In FIGS. 4 and 5 the locking strips are shown at two opposing longitudinal sides of the floorboards 9, 10. The floorboards 9, 10 also have locking means at their respective head sides, which however are not shown here.

The carrier plate 1' and the topside wood veneer 2, 3 and the carrier plate 1' and the bottom side balancing layer 7 are thermally pressed with each other and inseparably glued with each other. The gluing between the carrier plate 1' and the wood veneer 2, 3 is accomplished via the interposed resin 5. Also the balancing layer 7 is glued with the carrier plate 1' via a resin 5.

The floorboards 9, 10 are produced as described above. The individual floorboards 9, 10 are separated from the pressed multilayer body. Hereby the multilayer body is separated along the gaps 6 which extend over the entire length.

As can be seen in FIG. 4, in the floorboard 9 a border strip 16 made of resin 5 or a residual gap that had remained after profiling of eh side borders 11, 12 after the separation was removed. Wood veneer 2 and resin layer 4 end flush with the upper face side 17 of the side borders 11, 12.

In the floorboard 10 as shown in FIG. 5, a border strip 15, 16 is formed at the side borders 11, 12 of the wood veneer 3. Thus border strips 15, 15 are made of resin 5. The surface 18 of the border strips 15, 16 extends in the plane of the surface 8 of the wood veneer 3.

As mentioned above during the production of the floorboards 9, 10 the starting carrier plate 1 or the carrier plate 1', the wood veneer 2, 3 the balancing layer 7 with the interposed resin 5 are pressed to each other under heat influence. During the pressing procedure the resin 5 is plasticized. The resin 5 present between the starting carrier plate 1 and the wood veneer 2, 3 infiltrates the wood veneer 2, 3. Hereby the resin 5 can permeate the wood veneer 2, 3 up to the surface 8 of the wood veneer 2, 3. Pores, cracks, gaps or other flaws in the wood veneer are filled with resin 5 during the pressing. A subsequent gluing of the wood veneer 2, 3 with the starting carrier plate 1 follows and the smoothening of the surface 8 of the wood veneer 2, 3 together in one work step during pressing of the multiplayer body.

What is claimed is:

1. A method for producing floorboards each having a topside veneer, said method comprising:
    forming a multilayer body comprising a starting carrier plate, by placing a plurality of veneers on the starting carrier plate so that a gap is formed between neighboring ones of the veneers,
    placing a thermosetting resin between the starting carrier plate and the veneers, and placing a balancing layer arranged on a bottom side of the starting carrier plate;
    joining the starting carrier plate, the thermosetting resin, the veneers and the balancing layer by pressing the multilayer body in a press, wherein during the pressing process, the thermosetting resin adheres to a surface of the starting carrier plate facing the veneers, a surface of the veneers facing the starting carrier plate, and outer side surfaces of the veneers to form thermosetting resin side borders;
    separating the multilayer body into individual floorboards between the neighboring veneers in a region of the gap;
    profiling the individual floorboards at the thermosetting resin side borders of the floorboards; and
    providing the individual floorboards with joining means.

2. The method of claim 1, wherein during the pressing of the multilayer body a pressing pressure is greater than or equal to 1,000 Kilopascal, the pressing temperature is greater than or equal to 100° C., and the pressing time is between 10 and 60 seconds.

3. The method of claim 2, wherein the pressing pressure is greater than or equal to 3,500 Kilopascal.

4. The method of claim 2, wherein the pressing temperature is greater than or equal to 120° C.

5. The method of claim 2, wherein the pressing temperature is between 180° C. and 210° C.

6. The method of claim 2, further comprising applying a texture to a surface of the plurality of veneers during the pressing of the multilayer body during the press.

7. The method of claim 6, wherein the texture includes sub regions with varying glossiness.

8. The method of claim 7, wherein the texture possesses a depth of up to 0.6 mm.

9. The method of claim 6, wherein a depth of the texture is ⅔ of a thickness of each of the plurality of veneers.

10. The method of claim 2, wherein the veneers are vapored or smoked.

11. The method of claim 2, wherein the starting carrier plate is a wood board, and the veneers are one of oak, ash, larch or spruce.

12. The method of claim 1, wherein during the pressing of the multilayer body the gaps between the veneers are filled with the thermosetting resin.

13. The method of claim 1, wherein during the pressing of the multilayer body, the thermosetting resin infiltrates the veneers, wherein pores, cracks and/or gaps in the veneers are filled with the thermosetting resin.

14. The method of claim 1, wherein the pressing of the multilayer body is performed so that the thermosetting resin permeates the veneers and after the pressing the thermosetting resin is visible at a surface of the veneers.

15. The method of claim 1, further comprising during the profiling of the thermosetting resin side borders of the individual floorboards, removing a resin-filled residual gap remaining on a thermosetting resin side border of the individual floorboards after the separating step.

16. The method of claim 1, wherein during the profiling of the thermosetting resin side borders of the floorboards a border strip made of thermosetting resin is formed.

17. The method of claim 16, further comprising printing on the border strips of each of the floorboards.

18. The method of claim 1, wherein the thermosetting resin contains a filler.

19. The method of claim 18, wherein the filler is wood powder.

20. The method of claim 18, wherein the filler is mineral pigments.

21. The method of claim 1, further comprising printing a decor on a surface of the individual floorboards.

22. The method of claim 1, further comprising applying a sealing onto a surface of the individual floorboards.

23. The method of claim 1, further comprising subjecting a surface of the floorboards to a mechanical surface processing.

24. The method of claim 1, wherein the outer side surfaces of the veneers are substantially perpendicular to the surface of the starting carrier plate.

25. The method of claim 1, wherein the veneers are selected from wood veneers and cork veneers.

26. A method for producing a floorboard having a topside veneer, said method comprising:
    forming a multilayer body comprising a starting carrier plate, by placing a plurality of veneers on the starting carrier plate so that a gap is formed between neighboring ones of the veneers, placing a resin between the starting carrier plate and the veneers, and placing a balancing layer arranged on a bottom side of the starting carrier plate;
    joining the starting carrier plate, the resin, the veneers and the balancing layer by pressing the multilayer body in a press;
    separating the multilayer body into individual boards between the neighboring veneers in a region of the gap;
    profiling the individual boards at side borders of the boards; and
    providing the individual boards with joining means,
    wherein the resin is a resin paper impregnated with the resin, the resin paper extending over the starting carrier plate so that the plurality of veneers are each on the resin paper during the forming of the multilayer body and the pressing of the multilayer body in the press.

27. The method of claim 26, wherein
    the resin paper comprises a paper having a weight of 30 g/m² to 120 g/m², and
    the resin impregnating the resin paper has a weight at least two times greater than the paper.

* * * * *